(12) United States Patent
Tan

(10) Patent No.: US 7,689,828 B2
(45) Date of Patent: Mar. 30, 2010

(54) SYSTEM AND METHOD FOR IMPLEMENTING DIGITAL SIGNATURE USING ONE TIME PRIVATE KEYS

(75) Inventor: Telk Guan Tan, Singapore (SG)

(73) Assignee: Data Security Systems Solutions Pte Ltd, Singapore (SG)

( * ) Notice: Subject to any disclaimer, the term of this patent is extended or adjusted under 35 U.S.C. 154(b) by 1164 days.

(21) Appl. No.: 11/177,349

(22) Filed: Jul. 11, 2005

(65) Prior Publication Data

US 2006/0020811 A1  Jan. 26, 2006

(51) Int. Cl.
*H04L 9/00* (2006.01)
(52) U.S. Cl. ............... 713/180; 713/155; 713/157; 380/44; 380/277; 726/2; 726/10
(58) Field of Classification Search ........... 713/180, 713/155–157; 380/44, 277; 726/2, 10; 705/69
See application file for complete search history.

(56) References Cited

U.S. PATENT DOCUMENTS

| | | | | |
|---|---|---|---|---|
| 5,604,801 | A * | 2/1997 | Dolan et al. | 713/159 |
| 6,009,176 | A * | 12/1999 | Gennaro et al. | 713/170 |
| 6,854,056 | B1 * | 2/2005 | Benantar et al. | 713/156 |
| 2002/0069174 | A1 | 6/2002 | Fox et al. | |
| 2004/0054901 | A1 | 3/2004 | England et al. | |

FOREIGN PATENT DOCUMENTS

WO  WO 99/16209 A  4/1999
WO  WO 2004/032413 A  4/2004

OTHER PUBLICATIONS

Itkis G et al: "Forward-Secure Signatures with Optimal Signing and Verifying" Aug. 19, 2001, Advances in Cryptology. Crypto 2001. 21st Annual International Cryptology Conference, Santa Barbara, CA, Aug. 19-23, 2001. Proceedings; [Lecture Notes in Computer Science; vol. 2139], Berlin: Springer.; DE, pp. 332-354, XP000988708 ISBN: 978-3-540-42456-7 (relevant pp. 334-336).

* cited by examiner

*Primary Examiner*—Kimyen Vu
*Assistant Examiner*—Baotran N To
(74) *Attorney, Agent, or Firm*—Pyprus Pte Ltd

(57) ABSTRACT

The OTPK module 40 is essential to the present embodiment. It may be considered to be a software module implemented on the signing entity 20. The OTPK module 40 may be dynamically downloaded for use or implemented as a pre-installed client plug-in. The OTPK module 40 may perform its role without significant intervention from a user when operating as the signing entity 20. The OTPK module 40 may be implemented as a PKCS#11 or CAPI DLL or a Java Applet or ActiveX plugin embedded within the Internet Web Browser. It may be automatically executed when performing secure transactions requiring digital signatures. The OTPK module 40 serves to independently and without additional instruction from a user carry out the steps of generating the asymmetric key pairs comprising the public key and the private key. The OTPK module 40 then contacts the authentication and certification server 50 for authenticating the identity of the signing entity 20. At this point, the user of the signing entity 20 may be prompted for a password or the password may have been entered earlier as part of a 2-factor authentication to the authentication and certification server 50. The private key is then automatically used to generate a digital signature for the signing entity 20. At this point onwards, the private key is then irretrievably deleted such that it cannot be re-used or copied for future use.

9 Claims, 3 Drawing Sheets

SYSTEM AND METHOD FOR IMPLEMENTING DIGITAL SIGNATURE USING ONE TIME PRIVATE KEYS

FIELD OF THE INVENTION

The present invention relates to digital signatures using asymmetrical cryptographic keys. In particular, this invention relates to a system and method for implementing digital signatures using one time private keys.

BACKGROUND OF THE INVENTION

Digital signatures for verifying or authorizing of transactions, documents, contracts, prescriptions or others over the internet have become more widely used with the implementation of legislation on a global level accepting its use. Parts of the legislation includes guidelines on the security and authentication aspects of ensuring the legality of the digital signature.

Invariably, the use of PKI (Public Key Infrastructure) has been recognized in this legislation. When considering PKI for digital signatures, all entities involved in the transaction rely on a trusted third party to perform the necessary authentication of identity and trustworthiness of the entities. This trusted third-party is known as the CA (Certificate Authority).

The CA issues to each of the entities a digital certificate containing information such as the entity's name, country of origin, the policies governing the use of the digital certificate, and most importantly the Public Key of the entity.

The digital certificate from the CA asserts that the entity described in the digital certificate is the rightful and sole owner of a Private Key corresponding to the Public Key.

When a transaction needs to be signed by a digital signature, the signing entity uses its private key to digitally sign the transaction. An entity receiving the signed transaction will also receive the digital certificate of the signing entity. By using the public key in the digital certificate, the receiving entity can then verify that the transaction has been digitally signed by the correct party, i.e. the signing entity. The operations of PKI and its applications and limitations are well known and will not be further discussed.

One of the limitations imposed by legislation in ensuring the safe use of PKI, is the legal requirement that requires that the Private Keys of the signing entity is always and only in the possession of the signing entity. This attempts to ensure that other parties may not obtain use the private key of the signing entity to misrepresent his digital signature.

At present, there are several methods of ensuring the possession of the private keys as well as to prevent the theft or loss of the private key.

In one prior art method, smart cards are used. The private key is stored electronically on memory means on the smart card. A smart card reader would then be required to read the data from the smart card. To further ensure privacy, a password would have to be entered into a computer linked to the smart card allowing the private key from the smart card to be used for carrying out cryptographic operations. This method is however expensive and cumbersome to implement as a physical smart card as well as a card reader is required. In the event that the smart card is lost, a new smart card must be issued to the user while the private key of the old smart card must also be invalidated.

Microsoft's CSP (Cryptographic Service Provider) provides an alternative to the smart card. The Microsoft CSP is implemented as a software token that operates like a smart card, and would perform the functions of digitally signing transactions. Access to the Microsoft CSP is also via a password. However, a main concern is that the private key would be stored on a hard disk of a computer having the installed Microsoft CSP. This private key is disadvantageously open to attacks by computer viruses as well as hackers attempting to duplicate it.

Another prior art implementation is the KEON Web passport solution by RSASecurity, Inc. This is a "virtual" smart card solution which relies on a back end server to securely store the private key. When a user requires the use of the private key, the private key is then downloaded from the back end server to the user for his use. While this is considered slightly more secure than the CSP implementation, there is dispute as to whether the private key is "always" in the possession of the user.

Therefore, a need exists for an improved system and method for implementing digital signatures over a network which overcomes or at least alleviates the drawbacks of the prior art systems.

SUMMARY OF THE INVENTION

The present invention seeks to provide a system and method for implementing digital signatures using one time private keys.

Accordingly, in one aspect, the present embodiment provides a method for implementing transactions from a signing entity over a network to a receiving entity using digital signatures, the method comprising the steps:
a) providing instructions to a receiving entity for performing a transaction;
b) digitally signing the transaction with a digital signature generated by using a private key; and
c) irretrievably deleting the private key;

wherein the private key is used to generate the digital signature only once; and further wherein the private key never leaves the possession of the signing entity.

Accordingly, in a second aspect, the present embodiment provides a computer implementable method for implementing transactions by a signing entity over a network to a receiving entity using digital signatures, the method comprising the steps:
a) generating a new asymmetric key pair comprising a private key and a public key;
b) generating a certification request containing the public key;
c) generating the digital signature using the private key; and
d) irretrievably deleting the private key;

wherein the private key is used to generate the digital signature only once; and further wherein the private key never leaves the possession of the signing entity.

Accordingly, in a third aspect, the present embodiment provides a system for implementing transactions over a network using digital signatures comprises:
  a signing entity desiring to perform transactions over the network with a receiving entity;
  an OTPK (One-time Private Key) module residing in the signing entity for generating only new asymmetric key pairs comprising a public key and a private key, the OTPK module for generating a digital signature using the private key and a certification request containing the public key;
  an authentication and certification server for authenticating identity of the signing entity, for receiving the certification request and for issuing a digital certificate certifying ownership of the public key by the signing entity;

wherein the private key is used to generate the digital signature only once; and further wherein the private key never leaves the possession of the signing entity.

Accordingly, in a fourth aspect, the present embodiment provides a computer implementable method for using a One Time Private Key (OTPK) module to implement transactions by a signing entity over a network with a receiving entity using digital signatures in a newly initiated session, the method comprising the steps:

a) generating a new asymmetric key pair comprising a private key and a public key upon notification that a secure transaction requiring a digital signature is desired;
b) generating a certification request containing the public key;
c) generating at least one digital signature using the private key; and
d) irretrievably deleting the private key;

wherein the private key is used to generate the digital signature only while the newly initiated session is active; and further wherein the private key never leaves the possession of the signing entity.

BRIEF DESCRIPTION OF THE DRAWINGS

Embodiments of the present invention will now be more fully described, by way of example, with reference to the drawings of which.

DETAILED DESCRIPTION

In the following description, details are provided to describe the preferred embodiments of the invention. It shall be apparent to one skilled in the art, however, that the embodiments may be practiced without such details. Some of these details may not be described at length so as not to obscure the preferred embodiments.

Figure 1:
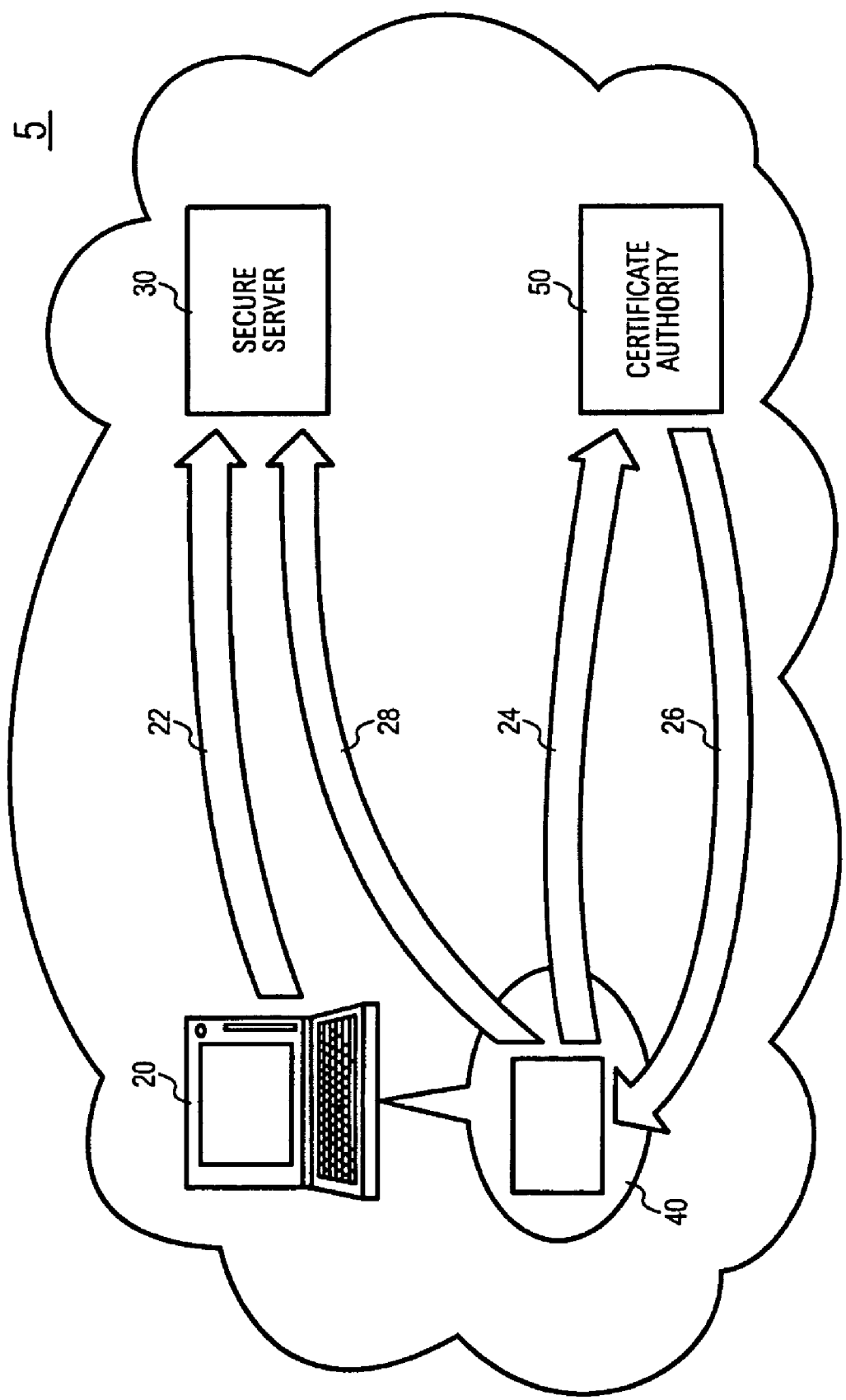
FIG. 1 illustrates a block diagram of a system for implementing transactions over a network using digital signatures in accordance with the present invention.

Referring to FIG. 1, a system 5 for implementing digital signatures over a network is shown comprising a signing entity 20, a secure server 30, an OTPK (One Time Private Key) module 40 and an authentication and certification server 50.

In the present example, the network is the Internet 10. The signing entity 20, the secure server 30, the OTPK module 40 and the authentication and certification server 50 are able to communicate with each other through established protocols of secure communications.

The signing entity 20 in the present embodiment embodies the computer of an entity desiring to perform transactions over the internet 10 requiring the use of digital signatures to accompany or authorize the transactions. The secure server 30 may be a service provider or a financial institution that receives from the signing entity 20 instructions to perform certain services or to facilitate the transacting of monies. The secure server 30 may also be interchangeably referred to as the receiving entity.

The signing entity 20 while typically considered to be a computer such as a PC or a Macintosh machine, may easily be any device enabled for communication. Some examples are wireless communication devices such as Mobile Phones, PDAs, and Notebooks with WI-FI. As such, the network may further comprise of both wired and wireless networks adopting any one of the established communication protocols for the transmission of data, in particular for transactions.

The authentication and certification server 50 may be easily related to the present day Certification Authority for the use of PKI. While the authentication and the certification portions may be implemented via different servers, the authentication and certification server 50 is referred to as a single entity in this example. The authentication and certification server 50 may also reside with the secure server 30 or the receiving entity and may not necessarily be an external party.

The OTPK module 40 can be considered to be a software module residing with the signing entity 20. The OTPK module 40 performs the function of generating only new asymmetric key pairs and also performs the functions of generating digital signatures or digitally signing the transactions. The OTPK module 40 performs its functions automatically without further intervention or instruction from the signing entity 20 or the user.

Figure 2:
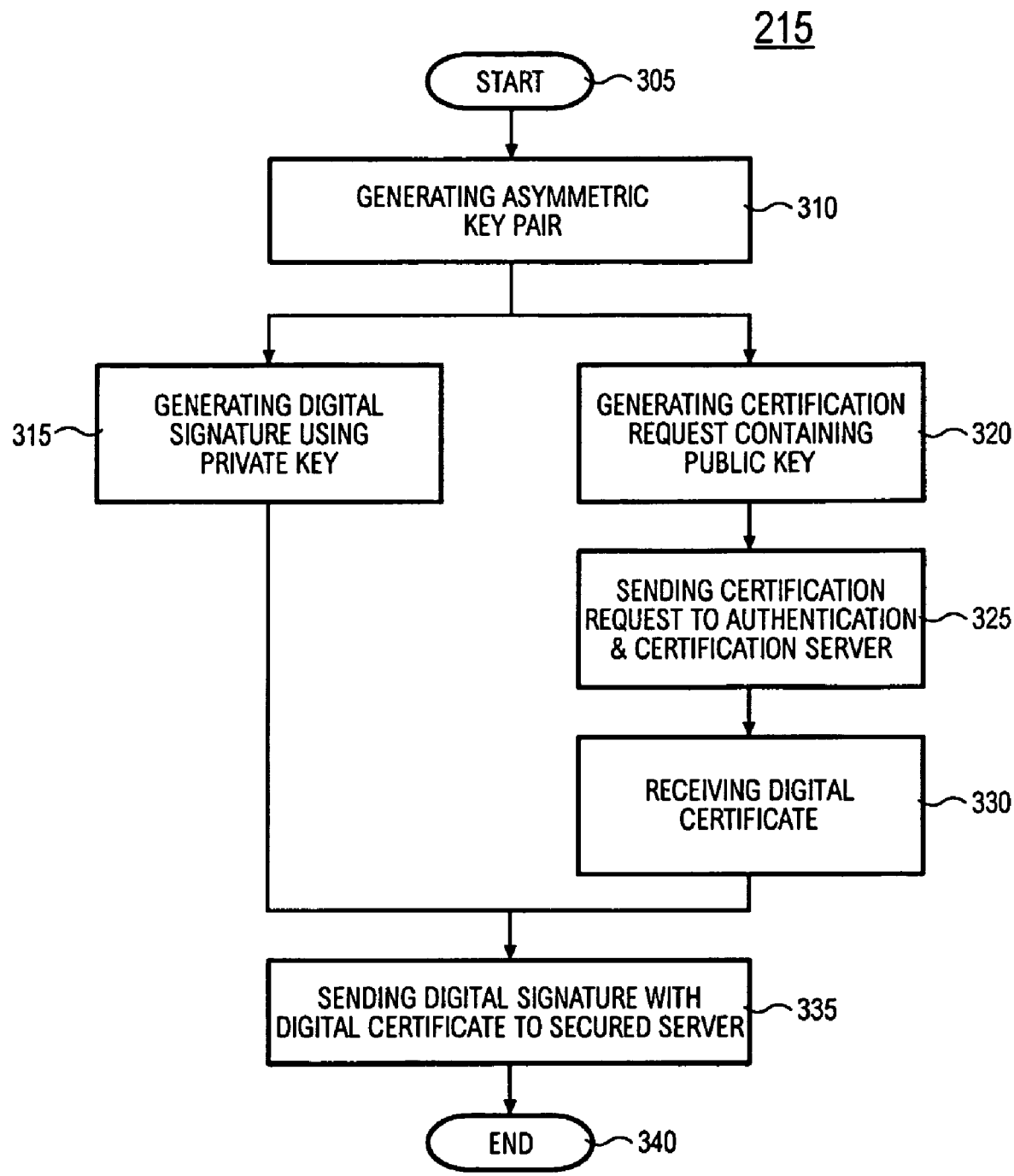
FIG. 2 illustrates a flowchart for a method for implementing digital signatures in accordance with the present invention.

Referring to FIG. 1 and FIG. 2, when a signing entity 20 wishes to perform a transaction accompanied by a digital signature with a service provider having the secured server 30 or the receiving entity, the method 200 for implementing transactions using digital signatures starts with the step of the signing entity 20 providing 210 instructions to the secured server 30 for performing a secure transaction. The instructions to the secured server 30 may comprise information pertaining to transactions of monies or may also comprise instructions or requests for services or goods.

Next the step of authorizing 215 the transaction or transactions contained in the instructions using digital signature is performed. The transactions or instructions are authorized by way of digital signatures. The secured servers 30 or receiving entities would be able to verify the digital signatures.

Next, the step of irretrievably deleting 220 a private key used to generate the digital signature is performed. Once the private key is irretrievably deleted, the deleted private key can no longer be re-used, it cannot be stolen and it cannot be abused by an unauthorized party.

Figure 3:
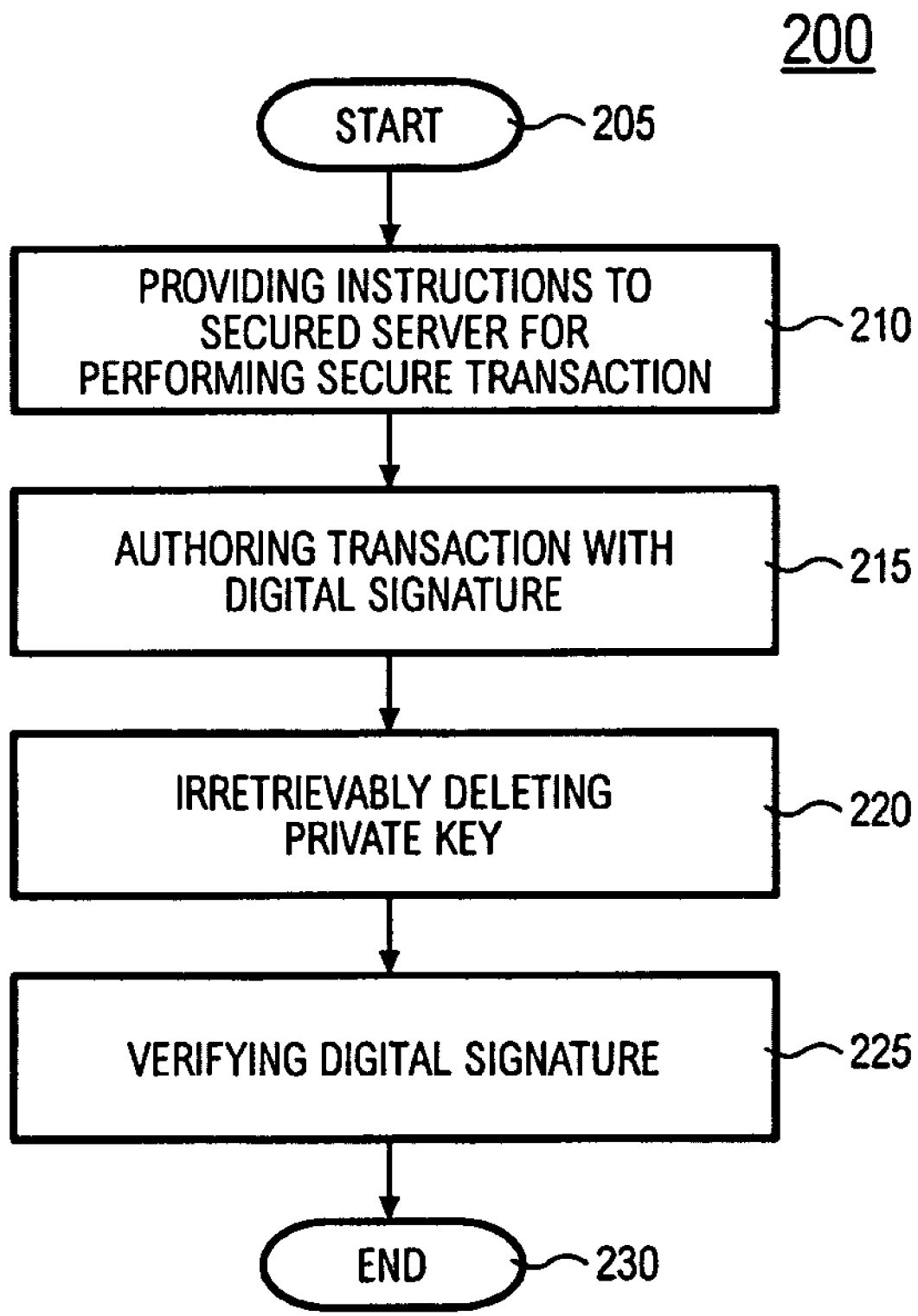
FIG. 3 illustrates a flowchart of the step of authorizing the transactions of FIG. 2.

Referring to FIG. 3, the step of authorizing 215 the transactions or providing the instructions to the secured server, further starts with the OTPK module 40 generating 310 a new asymmetric key pair comprising a private key and a public key.

Next, the step of generating 315 the digital signature using the private key is performed. Alternatively, the private key may be used to digitally sign the transaction being sent to the secured server 30.

Next, a certification request containing the public key is generated 320. The certification request is then sent 325 to the authentication and certification server 50, where the identity of the signing entity 20 is authenticated and a digital certificate is issued to certify the ownership of the public key. The digital certificate may be in a X.509 format and may further contain extensions and policies which in the present embodiment would state that the digital certificate is valid only for a single use.

The signing entity 20 then receives 330 from the authentication and certification server 50 the digital certificate certifying the ownership of the public key by the signing entity 20.

This may be referred to as a post-certification scenario as the private key is used to generate the digital signature or digitally sign the transaction before the digital certificate is received from the authentication and certification server 50.

Following which, the step of sending 335 the digital signature or the digitally signed transaction and the digital certificate to the secured server 30 is performed.

The secured server 30 or receiving entity upon receiving the digital signature and the digital certificate from the authentication and certification server 50 may then confirm the receipt of instructions from the signing entity 20 and proceed with the transaction proper or to carry out delivery of the goods and service requested. The digital certificate and the digital signature or digitally signed transaction are easily verified by the receiving entity.

The OTPK module 40 is essential to the present embodiment. It may be considered to be a software module implemented on the signing entity 20 such as a pre-installed client plug-in or it may be dynamically downloaded for use. The OTPK module 40 may perform its role without significant intervention from a user when operating with the signing entity 20. The OTPK module 40 may be implemented as a PKCS#11 or CAPI DLL or a Java Applet or ActiveX plugin embedded within an Internet Web Browser. It may be automatically launched by the signing entity 20 when performing secure transactions requiring digital signatures.

In another embodiment, the OTPK module 40 serves to independently and without additional instruction from a user carry out the steps of generating the new asymmetric key pairs comprising the public key and the private key. The OTPK module 40 may automatically establish communications with the authentication and certification server 50 for authenticating the identity of the signing entity 20.

At this point, the user of the signing entity 20 may be prompted for a password or the password may have been entered earlier as part of a 2-factor authentication to the authentication and certification server 50. The certification request containing the public key is then sent to the authentication and certification server 50. The public key may be packed into a PKC#10 block, WS_Security XML block or a symmetric key wrapped block and packaged into the certification request.

The private key is then automatically used to generate a digital signature for the signing entity 20 or it may be used to digitally sign a transaction to be sent. At this point onwards, the private key is then irretrievably deleted such that it cannot be re-used or copied for future use. At the same time, the private key thus always resides with and is in the possession of the signing entity 20. From the time the private key is generated to the time where it is irretrievably deleted, the private key is constantly in the possession of the signing entity 20 or the user. This fulfills an important legal requirement for the use of PKI for digital transactions over the internet.

Furthermore, the time period which the private key is in existence before being deleted is very short, and there is no opportunity for the private key to be stolen or copied elsewhere.

The OTPK module 40 receives the digital certificate certifying the signing entity's 20 ownership of the public key from the authentication and certifying server 50. The public key corresponds to the irretrievably deleted private key. The OTPK module then sends the digital certificate together with the generated digital signature to the secured server 30. The secured server 30 may then use the public key certified in the digital certificate to verify the authenticity of the digital signature.

The use of the OTPK module 40 allows for the secure implementation of digital signatures using PKI. The asymmetric key pairs are thus generated for every transaction and the private keys are irretrievably deleted once the digital signatures are generated. The time period which the private key is in existence before being deleted is very short, and there is advantageously no opportunity for the private key to be stolen or copied or re-used.

The OTPK module 40 further satisfies legislation requiring the private key to always be in the possession of the user. The private key is generated, used to generate the digital signature when it is in the possession of the user and then immediately irretrievably deleted.

In another embodiment, the OTPK module 40 may be used to generate asymmetric key pairs for a single session use rather than for a single transaction. When used in a single session setting, the private key generated is used to generate a plurality of digital signatures for a plurality of transactions so long as the initiated session by the user or the signing entity 20 remains active. Once the user or the signing entity 20 terminates the session, the private key is again irretrievably deleted to prevent the private key from being copied or re-used.

In yet another embodiment, the OTPK module 40 may be used to generate asymmetric key pairs for use in a pre-certification setting. In this setting, the certification requests containing the public key are generated and sent to the authentication and certification server 50. The private key is then used to generate the digital signature or to digitally sign the transactions only after the digital certificate is received from the authentication and certification server 50. The pre-certification setting may also be used in a single session use as well as for a single transaction.

The present embodiments advantageously does away with the use of smart cards for storage of the private key. The new private keys are generated as and when they are required for generating digital signatures and then immediately deleted.

Further, the window of opportunity for the copying of the private key is extremely short. Once the private key is generated, the digital signature may be generated or the transaction digitally signed, the private key may be deleted. This short existence of the private key as well as the absence of the private key being stored makes its virtually impossible to copy and duplicate the private key.

The present embodiment further advantageously does away with the need to lodge the certificate from the CA or in this case, the authentication and certification authority 50. This does away with the need to maintain and update an LDAP system. In conventional implementation of PKI, users would regularly look up the LDAP to ensure that the public key used by another party is still valid and being sent by the correct owner of an issued digital certificate. In the present embodiment, digital signatures are sent together with the digital certificates thus rendering the LDAP substantially irrelevant.

The CRL (Certification Revocation List) and the OCSP (Online Certificate Status Protocol) are similarly rendered irrelevant with the use of the OTPK module 40. The CRL and the OCSP have to be updated in conventional PKI systems when a private key is lost. In the present embodiment, the private key can never be lost and the public key is always revoked after a single use or a single session use.

The present embodiment also advantageously allows for ease of use by users as the OTPK module 40 does not require users to understand the processes involved in the generating of the digital signatures, nor the certification requirements of a valid certificate. The user further does not have to deal with additional complications of having a smart card and requiring the smart card data (the private key) to be read by a smart card reader.

The present embodiment also satisfies the regulatory requirements in most jurisdictions that the private key is always in possession of the signing entity 20 or the user. The private key generated by the OTPK module 40 is only in existence for a short duration of time. During this short duration of time, the private key is always with the signing entity 20 and the user.

The OTPK module 40 of the present embodiments further are not restricted to any single one asymmetric algorithm. Any of the many asymmetric algorithms such as RSA, DSA and ECDSA may be implemented. Furthermore, different signing entities 20 may also use different symmetric algorithms in their OTPK modules 40.

In addition to using the OTPK module 40 for secure transaction over the internet, it may have other applications in the field of Digital Rights protection. A digital original work may be protected using a digital signature for proof of ownership by an individual or an entity. The digital signature is usually embedded using steganography techniques to hide the digital signature within the digital original work. Since such operations are often carried out as a one-off digital signature for each work, the use of the OTPK module 40 could well be considered. An additional advantage of using the OTPK module 40 in digital rights protection is that the asymmetric keys and digital certificates for each work are always different. This makes it harder for a potential perpetrator to locate and remove the digital signature and certificate from the digital original works.

It will be further appreciated that although the embodiments have been described in detail, various modifications and improvements can be made by a person skilled in the art without departing from the scope of the described embodiments.

Furthermore, while the embodiments have been described to be performed in various sequence of steps, the described steps are not limited to the sequences described nor were they intended to. Varying the sequence of the steps involved in the described embodiments may be performed by one skilled in the art without departing from the scope of the described embodiments.

The invention claimed is:

1. A method for implementing transactions from a signing entity over a network to a receiving entity using digital signatures, the method comprising the steps:
   a) providing instructions to the receiving entity for performing a transaction;
   b) generating a new asymmetric key pair as and when a digital signature is needed, wherein the new asymmetric key pair comprises a new private key and a public key by an One Time Private Key (OTPK) module, and wherein the new private key is randomly generated at possession of the signing entity;
   c) generating the digital signature using the new private key;
   d) generating a certification request containing the public key;
   e) irretrievably deleting the new private key;
   f) sending the certification request to an authentication and certification server;
   g) receiving a digital certificate from the authentication and certification server certifying ownership of the public key; and
   h) sending the digital signature together with the digital certificate to the receiving entity;
   wherein each new private key is used to generate the digital signature only once; and
   the new private key never leaves the possession of the signing entity.

2. The method of claim 1, wherein the steps are carried out sequentially.

3. The method of claim 1, wherein the steps are carried out in the following sequence: step a), step b), step d), step f), step g), step c), step e), and step h).

4. A computer implementable method for implementing transactions by a signing entity over a network to a receiving entity using digital signatures, the method comprising the steps:
   a) generating a new asymmetric key pair as and when a digital signature is needed, wherein the new asymmetric key pair comprises a new private key and a public key, and wherein the new private key is randomly generated at possession of the signing entity;
   b) generating a certification request containing the public key;
   c) generating the digital signature using the new private key; and
   d) irretrievably deleting the new private key;
   e) establishing communications with an authentication and certification server for authenticating the identity of the signing entity;
   f) sending the certification request containing the public key to the authentication and certification server;
   g) receiving from the authentication and certification server a digital certificate certifying the ownership of the public key; and
   h) sending the digital signature and the digital certificate to the receiving entity;
   wherein each new private key is used to generate the digital signature only once; and
   the new private key never leaves the possession of the signing entity.

5. The method of claim 4, wherein the steps are carried out sequentially.

6. The method of claim 4, wherein the steps are carried out in the following sequence: step a), step b), step e), step f), step g), step c), step d), and step h).

7. A system initiates a transaction over a network using digital signatures comprises:
   a signing entity desiring to perform transactions over the network with a receiving entity;
   an OTPK (One-time Private Key) module residing in the signing entity for generating only new asymmetric key pair as and when a digital signature is needed, wherein the new asymmetric key pair comprises a public key and a new private key, the OTPK module for generating the digital signature using the new private key and a certification request containing the public key;
   an authentication and certification server for authenticating identity of the signing entity, for receiving the certification request and for issuing a digital certificate certifying ownership of the public key by the signing entity;
   wherein each new private key is used to generate the digital signature only once; and the new private key never leaves the possession of the signing entity.

8. The system of claim 7, wherein the OTPK module automatically sends the digital signature and the digital certificate to the secured server, wherein the new private key remains at the possession of the signing entity.

9. The system of claim 7, wherein the OTPK module performs its functions without additional interference or instruction from the signing entity.

* * * * *

UNITED STATES PATENT AND TRADEMARK OFFICE
CERTIFICATE OF CORRECTION

PATENT NO. : 7,689,828 B2
APPLICATION NO. : 11/177349
DATED : March 30, 2010
INVENTOR(S) : Teik Guan Tan It is certified that error appears in the above-identified patent and that said Letters Patent is hereby corrected as shown below:

Title page, No. (75), delete "Telk" and replace with "Teik"

Signed and Sealed this

Fifteenth Day of June, 2010

David J. Kappos
*Director of the United States Patent and Trademark Office*